United States Patent [19]
Ann et al.

[11] Patent Number: 5,948,153
[45] Date of Patent: Sep. 7, 1999

[54] WATER-SOLUBLE COMPLEXES OF OPTICAL BRIGHTENERS AND QUATERNARY AMMONIUM COMPOUNDS WHICH ARE SUBSTANTIALLY FREE FROM UNWANTED SALTS

[75] Inventors: Qinghong Jessica Ann; Xiaodong Edward Zhao, both of Moore; James Michael Spry, Spartanburg, all of S.C.

[73] Assignee: Milliken & Company, Spartanburg, S.C.

[21] Appl. No.: 09/065,619

[22] Filed: Apr. 24, 1998

[51] Int. Cl.$^6$ .......................... C09D 11/00; C09B 67/54; C11D 3/42
[52] U.S. Cl. .................................. 106/31.43; 106/31.64; 8/606; 8/557; 510/516; 510/324; 524/590
[58] Field of Search .................. 510/324, 325, 510/287, 307, 516, 394; 442/130; 8/648, 606, 557; 106/31.43, 31.64, 31.27, 31.49, 272; 524/590, 583, 585, 601

[56] References Cited

U.S. PATENT DOCUMENTS

| | | | |
|---|---|---|---|
| 3,859,350 | 1/1975 | Sahm et al. | 260/346.2 R |
| 4,187,226 | 2/1980 | Patsch et al. | 260/239.8 |
| 4,187,289 | 2/1980 | Eckhardt | 424/70 |
| 4,233,167 | 11/1980 | Sramek | 252/8.75 |
| 4,369,041 | 1/1983 | Dvorsky et al. | 8/532 |
| 4,374,643 | 2/1983 | Suzuki et al. | 8/648 |
| 4,388,079 | 6/1983 | Suzuki et al. | 8/648 |
| 4,441,884 | 4/1984 | Baumann et al. | 8/542 |
| 4,459,130 | 7/1984 | Helling et al. | 8/554 |
| 4,460,374 | 7/1984 | Abel et al. | 8/501 |
| 4,466,900 | 8/1984 | Horlacher et al. | 252/301.23 |
| 4,478,598 | 10/1984 | Meyer et al. | 8/648 |
| 4,507,407 | 3/1985 | Kluger et al. | 521/113 |
| 4,526,694 | 7/1985 | Puchta et al. | |
| 4,559,150 | 12/1985 | Becker et al. | 252/8.6 |
| 4,563,190 | 1/1986 | Töpfl | 8/524 |
| 4,640,690 | 2/1987 | Baumgartner et al. | 8/506 |
| 4,648,883 | 3/1987 | Podder | 8/527 |
| 4,702,744 | 10/1987 | Wolff et al. | 8/527 |
| 4,888,128 | 12/1989 | Koll et al. | 252/301.23 |
| 5,006,125 | 4/1991 | Patton et al. | 8/188 |
| 5,024,786 | 6/1991 | Farrar et al. | |
| 5,059,244 | 10/1991 | King et al. | 106/21 |
| 5,082,578 | 1/1992 | Langer et al. | 252/8.7 |
| 5,096,458 | 3/1992 | Michna et al. | 8/527 |
| 5,145,485 | 9/1992 | Michna et al. | 8/527 |
| 5,149,463 | 9/1992 | Peterson | 252/301.21 |
| 5,250,107 | 10/1993 | Bares | 106/20 R |
| 5,266,077 | 11/1993 | Auten et al. | 8/507 |
| 5,279,772 | 1/1994 | Eckhardt et al. | 252/558 |
| 5,356,441 | 10/1994 | Tokieda et al. | 8/543 |
| 5,403,358 | 4/1995 | Aston et al. | 8/445 |
| 5,534,192 | 7/1996 | Incorvia et al. | |
| 5,679,115 | 10/1997 | Fritzsche et al. | 8/444 |

FOREIGN PATENT DOCUMENTS

| | | |
|---|---|---|
| 2527703 | 1/1977 | Germany . |
| 3147885 | 12/1978 | Japan . |
| 804678 | 2/1981 | U.S.S.R. . |

*Primary Examiner*—Deborah Jones
*Assistant Examiner*—Jason Savage
*Attorney, Agent, or Firm*—Terry T. Moyer; William S. Parks

[57] ABSTRACT

This invention relates to water-soluble complexes of optical brighteners with quaternary ammonium compounds which are substantially free from unwanted salts. Such complexes are formed through ionic bonds formed between the two compounds. The inventive complexes are then removed of substantially all excess unwanted salt so as to obtain an optical brightener compound which easily solubilizes within, dispenses from, and exhibits excellent compatibility with standard detergent and softener compositions, which exhibits the desired degree of affinity for various substrate surfaces, including textile, paper, wood, and plastics, as well as within leak detector formulations, and which provides a desired accumulation effect on substrate surfaces upon repeated treatments. Such inventive complexes can also be utilized to whiten thermoplastics and thermosets. Furthermore, this invention also concerns methods of making and utilizing such inventive optical brightening complexes.

14 Claims, No Drawings

WATER-SOLUBLE COMPLEXES OF OPTICAL BRIGHTENERS AND QUATERNARY AMMONIUM COMPOUNDS WHICH ARE SUBSTANTIALLY FREE FROM UNWANTED SALTS

FIELD OF THE INVENTION

This invention relates to water-soluble complexes of optical brighteners with quaternary ammonium compounds which are substantially free from unwanted salts. Such complexes are formed through ionic bonds formed between the two compounds. The inventive complexes are then removed of substantially all excess unwanted salt so as to obtain an optical brightener compound which easily solubilizes within, dispenses from, and exhibits excellent compatibility with standard detergent and softener compositions, which exhibits the desired degree of affinity for various substrate surfaces, including textile, paper, wood, and plastics, as well as within leak detector formulations, and which provides a desired accumulation effect on substrate surfaces upon repeated treatments. Such inventive complexes can also be utilized to whiten thermoplastics and thermosets. Furthermore, this invention also concerns methods of making and utilizing such inventive optical brightening complexes.

BACKGROUND OF THE PRIOR ART

All of the patents cited throughout this specification are hereby entirely incorporated herein.

Quaternary ammonium compounds are well known as complexing agents for certain compounds, such as anionic dyes. For example, U.S. Pat. No. 5,059,244, to King, discloses an aqueous solution of anionic dyes and an ethoxylated triethanolamine. This composition is useful as an ingredient within ink formulations and as an agent for temporarily tinting textile fibers. Quaternary ammonium compounds have been disclosed as useful auxiliary agents for printing on fiber materials. For example, U.S. Pat. No. 3,785, 767, to Hildebrand, discloses a pad-steaming process for the continuous dyeing and printing of fiber material with a formulation containing anionic dyes and amine salts. Other pertinent teachings include U.S. Pat. No. 4,563,190, to Topfl, which discloses a dyeing assistant formulation for anionic dyes containing quaternary ammonium compounds that contain at least one basic nitrogen atom to which are attached at least one polyglycol ether chain; U.S. Pat. No. 4,935,033, to Mosimann et al., which discloses a dyeing method for natural polyamide fibers using reactive dyes and a dyeing assistant agent containing a quaternary ammonium compound; and U.S. Pat. No. 4,369,041, to Dvorsky et al., discloses a technique for printing textiles involving exposing the textile to the action of quaternary ammonium compounds before or during the dyeing or printing with acid dyes. Furthermore, Aston et al., U.S. Pat. No. 5,403,358, discloses a pretreatment composition for ink jet which comprises a quaternary ammonium compound and a reactive dye. Such anionic dyes and quaternary ammonium compounds also find application in other areas, for instance: U.S. Pat. No. 4,459,130, to Helling et al., discloses a dye preparation which is consisted of an acid dye and a basic carrier which contains quaternary ammonium or phosphonium groups; and U. S. Pat. No. 5,266,077, to Auten et al., discloses a method for tinting a hydrophilic contact lens through the action of a quaternary ammonium compound as a dye complexing agent.

However, there is no specific teaching of a water-soluble, substantially salt-free complex of an optical brightener and a quaternary ammonium compound. The closest prior art, U.S. Pat. No. 4,888,128, to Koll et al., discloses water-insoluble brightener salts which are products of the reaction between anionic cellulose fluorescent brighteners and quaternary ammonium compounds as whiteners for paper-coating slips. There is no disclosure nor fair suggestion of the inventive substantially salt-free water-soluble optical brightening complexes whatsoever anywhere within patentee's teachings. Water solubility is of utmost importance to the inventive complex as such a property provides substantial benefits in dispensability and compatibility within various substrates.

It has been found that the complexation of an anionic, preferably sulfonated, optical brightener with specific types of quaternary ammonium compounds and the subsequent removal of substantially all the excess salt formed during such a reaction produces a water-soluble compound which possesses the highly desired and unexpected characteristics as listed above. Therefore, through the utilization of inexpensive reactions and quaternary ammonium compounds, the cost of providing a highly compatible, soluble, dispensable, and wash- and light-fast optical brightener compound with an affinity for myriad substrates can be greatly reduced. Therefore, it has been found that water-soluble substantially salt-free optical brightener/quaternary ammonium colorant complexes provide a cost-effective method of providing a great deal of highly desirable and beneficial brightening properties to many different substrates.

When placed in a complexing solution, the anionic brighteners and the quaternary ammonium compounds show great affinity for one another such that upon disassociation with their respective cations and/or counter ions, the complexation of the brightener and quat drives the formation of the excess salts comprised of the free cations and counter ions. Once the salts are formed, they are easy to remove through filtration, phase separation, or extraction techniques. Such a salt removal ensures the brightener and quat will remain in a complex together rather than potentially reacting with free cation and/or counter ion upon disassociation within the resultant optical brightener solution. Thus, the desired properties are obtained with a greater amount of the brightener/quat complex and a much lower amount of residual salt.

OBJECTS OF THE INVENTION

It is therefore an object of this invention to provide a water-soluble substantially salt-free complex of optical brighteners and quaternary ammonium compounds, as improved optical brightening for various substrates and media. A further objective of this invention is to provide an optical brightening compound which can be used for the treatment of textile, paper, wood, thermoplastics, thermosets, and any other surfaces which require whitening and/or brightening due to dullness.

SUMMARY OF THE INVENTION

Water-soluble optical brightener/quat complexes which are substantially free from unwanted salts, and, more importantly, the advantages and applications of such water-soluble complexes have heretofore been unexplored. Anionic optical brighteners, which are the preferred types within the inventive complex, might contain residual or excess unwanted salts. As discussed in greater detail below, such salts are also byproducts from the complexation between anionic optical brighteners and quaternary ammonium compounds. These salts may be inorganic in nature or they may include organic cations or counter-ions. Generally, sodium salts (such as sulfates or chlorides) will be produced during the complexation step, although, as noted above, other types of salts, including organic salts, which are unwanted within the complex may also be complexation byproducts and thus require substantial removal in order for the inventive complex to function properly. With the presence of such unwanted salts in the composition, either the quaternary ammonium compounds or the inorganic cations may serve as counter ions for the complexed anionic brighteners. As a result, the chances for continued complexation between the optical brightener and quat components decreases with the presence of increased amounts of such salts. Since the brightener and quat compounds will disassociate in solution, some free anionic brightener will inevitably bond to free cations and some free quat will inevitably bond with free counter ions, thereby lowering the overall washfastness, composition compatibility, solubility, dispensability, and/or substrate affinity of the brightener/quat complex. These potentially deleterious effects are thus more pronounced upon greater amounts of residual unwanted salt. Thus, salt-containing heterogeneous optical brightener/quat complex systems show uneven solubility, compatibility, poor washfastness, and/or the like, in different substrate treatments. Such complexes are therefore unsuitable as optical brightening compounds, even though optical brighteners are present within such solutions. The term "washfastness" used throughout this disclosure is intended to mean an accumulation effect of the inventive complex on substrate surfaces upon repeated treatments. The complex will not be removed from such surfaces but will, surprisingly, cohesively attach to other salt-free brightener/quat complexes thereby producing uniform layers of brighteners over the entire treated substrate.

It has been discovered that a water-soluble substantially salt-free solid anionic optical brightener/quaternary ammonium complex provides favorable brightening, compatibility, solubility, dispensability, and washfastness, all with an affinity for such substrates as textiles, paper, wood, plastics, leak detectors, and the like. The substantial removal of unwanted salts provides an improved stability for the complexes. Furthermore, the aforementioned physical properties of the complex can be tailored to any particular requirement by altering the structure of the quaternary ammonium compound. For instance, a quaternary ammonium compound having the proper hydrophobic/hydrophilic balance affords the user, upon complexation with an anionic optical brightener and removal of substantially all of the resultant salt, an optical brightening complex which is water-soluble and exhibits a great affinity for substrates such as textiles, plastics, paper, and the like. Therefore, the inventive complexes may be incorporated within any number of different compositions including aqueous formulations, and plastics, such as polyolefins, polyurethanes, and polyesters, as merely examples.

The term "aqueous" as used herein encompasses any liquid formulation which is comprised of water in any amount. Since the inventive complexes are water-soluble, some amount of water should be present within which the complexes may dissolve. Such aqueous formulations thus include cleaning solutions, detergents, fabric softeners, surfactant formulations, descalers, and the like. Thus, the inventive complex may be added to any such formulation which comprises at least one surfactant or at least one commonly used textile softener. Such softeners are well known within the fabric softening art and include any number of quaternary ammonium compounds, such as imidazolinium quats, benzyl quats, tetraalkyl quats, trialkyl quats, dialkyl quats, monoalkyl quats, and their corresponding monoalkoxy or polyalkoxy compounds.

The term "textile" as used herein encompasses any myriad articles. Among these are fabrics, including natural and synthetic fibers. Such fibers include cotton, nylon, polyester, ramie, acetate, lycra, and the like, as well as blends thereof. The term "cellulose-based substrate" is intended to paper products, such as writing paper of any bond, cardboard, poster board, and the like.

Plastics, both thermoplastics and thermosets, oftentimes require a certain degree of whitening in order to retain a desired level of aesthetics. Therefore, the incorporation of a highly compatible, easily dispensed, long-lasting washfast optical brightener is potentially a highly useful concept. Troubles with incorporating dyes and colorants within such thermoplastics and thermosets are well documented and are similar to the difficulties encountered within the optical brightening area. Exemplary of such work with dyes and colorants, as well as suitable definitions and scope of the terms "thermoplastics" and "thermosets" as used herein are set forth U.S. Pat. Nos. 4,640,690, to Baumgartner et al., and 4,507,407, to Kluger et al., both hereby entirely incorporated by reference.

The inventive complexes can be used for providing extensive benefits, as those mentioned previously, to various different and diverse media and substrates. Virtually all types and classes of anionic optical brighteners can be adopted to practice this invention; however, preferred are those which include sulfonate moieties as reactive sites for bonding with the cationic groups on the quat compound. More preferred are those anionic absorbers which are based on stilbene, such as, as merely preferred examples, tetrasulfonated stilbene-triazine derivatives (such as trade name Optiblanc™ AC), disulfonated stilbene-triazine derivatives (such as trade name Optiblanc™ NS 100), as well as hexa-sulfonated stilbene-triazine derivatives (basically any symmetrical sulfonated stilbene-triazine derivative). Such optical brighteners are well known to possess desired brightening characteristics; however, these compounds do not provide the desired levels of diluent compatibility, solubility, and dispensability, nor high degrees of washfastness (thus requiring continued application of relatively expensive compounds to generate less than optimum performance over time). Furthermore, such compounds do not possess the requisite affinity for the same wide variety of subject substrates as does the inventive complex. The cationic ammonium group bonds with free reactive groups (i.e., sulfonic and/or carboxylic acid) on the anionic brightener so as to form ionic bonds. It is not fully understood how the interaction between the cationic moiety of the quaternary ammonium and the anionic moieties of the brightener is accomplished; however, as discussed above, it is evident that the quaternary ammonium compound has a greater affinity for the anionic brightener rather than for the anionic counter ion to which such quats are generally bonded. The same holds true for the anionic brightener which has more of an affinity for the cationic quat rather than for the cationic counter ion. Upon complexation, then, the free counter ions of both components react together to form the aforementioned inorganic salts which require removal (at least to a substantial extent) from the resultant complex in order to provide the desired aforementioned beneficial properties. The permissible level of remaining salt, and thus the definition of substantially salt-free for this invention, within the inventive complex is, at most, about 5,000 ppm. In theory, it is impossible to remove all of the inorganic salt from such complexes; however, at such low, permissible, and attainable levels of salt content, the desired washfastness, substrate affinity, and the like, characteristics may be obtained. Certainly, a level of no salt at all would be most preferred, although such a level is, as noted above, nearly impossible to achieve.

A wide range of quaternary ammonium compounds have been shown to be useful for practicing the invention. A broad list of potentially useful quats within this invention include trialkyl, dialkyl, dialkoxy alkyl, monoalkoxy, mono-substituted polyalkoxy alkyl, di-substituted polyalkoxy alkyl, tri-substituted polyalkoxy alkyl, benzyl, and imidazolinium quaternary ammonium compounds. Of particular interest as quaternary ammonium compounds within the inventive complex are those which comprise alkoxylated moieties. Preferred quats include, as merely examples, dialkoxy alkyl quats, such as methyl bis(polyethoxyethanol) coco ammonium chloride, mono-substituted polyalkoxyalkyl quats, di-substituted polyalkoxyalkyl quats, and tri-substituted polyalkoxyalkyl quats. The target amount of residual inorganic salts within the inventive complex is generally between about 50 ppb and 5000 ppm. Typically sodium counter ions, and thus sodium salts, are the residual inorganic ions and salts within such anionic dyes. Monitoring of the inorganic salt level is available through conveniently and easily performed measurements of the sodium ion level within the composition. Additionally, the inventive water-soluble substantially inorganic salt-free optical brightener/quat complexes facilitates handling, particularly within liquid compositions, during applications to substrates and media which is not an evident property with standard optical brightening compositions.

Various purification techniques may be performed in order to remove substantially all of the residual inorganic salts from the complexes. Such techniques include, but are not limited to, solvent extraction, phase separation, ultrafiltration, and other filtration methods. Particularly preferred are ultrafiltration under high pressure, phase separation through the utilization of an ammonium carbonate rinsing procedure (i.e., three consecutive washings with 25% aqueous ammonium carbonate in a 1:1 weight ratio to complex), and solvent extraction filtration through the utilization of methylene chloride. After the removal of excess inorganic salt, the resultant solution should also be stripped of excess water in order to purify the optical brightener complex.

Basically, then, the simplest manner of practicing the invention is to first determine the desired optical brightener for its whitening capability, lightfastness, thermal stability, and the like, characteristics for the subject substrate to be brightened and/or whitened; second, select the appropriate quaternary ammonium compound for the subject substrate based on the necessarily required physical properties such as migration, uniform dispersion, solubility, washfastness, and the like; third, react the two together to form a complex; and last, remove the unwanted salts from the complex.

DESCRIPTION OF THE PREFERRED EMBODIMENT

Without limiting the scope of the invention, the preferred features of the invention are exemplified below.
Synthesis of Optical Brightener Complex

EXAMPLE 1

Six parts of disulfonated stilbene-triazine derivative (trade name Optiblan™ NS 100) and ten parts of methylpolyoxyethylene (15) coco ammonium chloride, available from Akzo Nobel Chemicals under the tradename Ethoquad® C/25, were dissolved into 60 parts of water/methanol solution (5/1, v/v). The solution was stirred for 2-3 hours. The polymeric optical brightener was purified through phase separation and extraction with chloroform as the chloroform solution was stripped at reduced pressure to yield the purified complex. The purified polymeric optical brightener was a slightly yellowish liquid and was readily dissolved within water.

EXAMPLE 2

Six parts of tetrasulfonated stilbene-triazine derivative (trade name Optiblanc™ AC) and ten parts of Ethoquad® C/25 were dissolved into 60 parts of water/methanol solution (5/1, v/v). The solution was stirred for 2-3 hours. The polymeric optical brightener is purified through phase separation and extraction with chloroform as the chloroform solution was stripped at reduced pressure to yield the purified complex. The purified polymeric optical brightener was a slightly yellowish liquid and easily dissolved within water.

EXAMPLE 3 (Comparative)

Three parts of disulfonated stilbene-triazine derivative (trade name is Optiblanc™ NS 100) and six parts of a non-alkoxylated quat, dimethyl coco benzyl ammonium chloride, available from Akzo Nobel Chemicals under the tradename Arquad® DMCB 80, were dissolved into 30 parts of water/methanol solution (5/1, v/v). The solution was stirred for 3-4 hours. The polymeric optical brightener was purified through phase separation and extraction with chloroform as the chloroform solution was stripped at reduced pressure to yield the purified complex. The purified polymeric optical brightener was a slightly yellowish gel and which dispersed within water in the presence of surfactant.

EXAMPLE 4 (Comparative)

Three parts of tetrasulfonated stilbene-triazine derivative (trade name Optiblanc™ AC) and Six parts of Arquad® DMCB 80 were dissolved into 30 parts of water/methanol solution (5/1, v/v). The solution was stirred for 3-4 hours. The polymeric optical brightener was purified through phase separation and extraction with chloroform as the chloroform solution was stripped at reduced pressure to yield the purified complex. The purified polymeric optical brightener was a slightly yellowish gel which dispersed within water in the presence of surfactant.

Applications of the Inventive Brightener Complexes
  A. Laundry Applications

The complexes formed in EXAMPLEs 1 and 3, above, were then tested in order to compare their whitening and washfastness properties. The complexes were added with detergent compositions in the wash water for cotton laundry samples as noted in the EXAMPLEs below. The results for these EXAMPLES are tabulated below also:

EXAMPLE 5

The water solution of EXAMPLE 1 containing Optiblanc™ NS 100 and Ethoquad® C/25 complex was introduced within a textile treatment composition. 100 ml of the EXAMPLE 1 solution (containing 0.5g of the complex) was introduced into 21–22g of powdered Tides detergent. The resultant solution was then introduced within a standard washing machine containing a total weight of fabric of about 350 g, including a dummy load of about 331–332g and an actual test substrate load of about 18–19 g of 100% cross-linked cotton fabric samples. Cross-linked cotton was utilized because such a fabric is similar in performance to standard polyesters which generally initially comprise, within individual fibers, traditional optical brightening compounds. Therefore, cross-linked cotton gives results which would be similar to polyester. Samples were tested after one wash and five washes respectively. The samples were then measured by AATCC Test Method 110, Whiteness of Textiles testing procedure, herein fully incorporated by reference. Measurements were made of chromaticity coordinates of the specimen test fabric. Such coordinates are listed below as Y*, x* and y*. These measurements were then plugged into the Whiteness equation:

$$W^* = Y^* + 800(0.3138 - x^*) + 1700(0.3310 - y^*)$$

in order to generate a numerical value for the whiteness of the test specimens. The Examples listed within TABLE 2 below correspond to the following:

A—Control with no washing performed
B—One wash performed with Tide® alone
C—Five washes performed with Tide® alone
D—One wash performed with Tide® and inventive complex
E—Five washes performed with Tide® and added inventive complex The results are tabulated below:

TABLE 2

Brightening Results Within Tide ® Detergent

| Example | Y* | x* | y* | Whiteness |
|---------|-------|------|------|-----------|
| A | 89.82 | 0.32 | 0.33 | 92.71 |
| B | 89.62 | 0.32 | 0.33 | 95.77 |
| C | 90.36 | 0.31 | 0.32 | 99.68 |
| D | 91.05 | 0.31 | 0.32 | 103.88 |
| E | 91.78 | 0.31 | 0.32 | 108.36 |

The brightness differences could be easily detected by the eye under incandescent light.

EXAMPLE 6 (Comparative)

The water dispersion of Comparative EXAMPLE 3, Optiblanc™ NS 100 and Arquad® DMCB 80 complex was introduced into a textile treatment composition. 100 ml of the EXAMPLE 3 solution (containing 0.5 g of the complex) were introduced into 21–22 g of powdered Tide® liquid detergent. The resultant solution was then introduced within a standard washing machine containing about 18–19 g of 100% cross-linked cotton fabric samples. Samples were tested after one wash and five washes respectively. The samples were then measured by AATCC Test Method 110, Whiteness of Textiles testing procedure. The Examples listed within TABLE 3 below correspond to the following:

A—Control with no washing performed
B—One wash performed with Tide® alone
C—Five washes performed with Tide® alone
D—One wash performed with Tide® and comparative complex
E—Five washes performed with Tide® and added comparative complex The results are tabulated below:

TABLE 3

Brightening Results within Tide ® Detergent

| Example | Y* | x* | y* | Whiteness |
|---------|-------|------|------|-----------|
| A | 89.35 | 0.32 | 0.33 | 93.33 |
| B | 88.99 | 0.32 | 0.33 | 92.95 |
| C | 90.06 | 0.31 | 0.32 | 97.79 |
| D | 99.98 | 0.31 | 0.32 | 100.59 |
| E | 90.28 | 0.31 | 0.32 | 103.89 |

The correlative values to those in TABLE 2 show the improvements obtained with the inventive complex.

Water-soluble complexes, such as those containing alkoxylated quaternary ammonium compounds therefore perform better than the water-insoluble complexes. For example, the Ethoquad® quat-containing inventive complexes easily dissolve in water alone and thereby exhibit uniform distribution and coating on the surface of the subject textile substrate. There are no "oily spots" present which can oftentimes be observed on textile surfaces through the utilization of water-insoluble (which indicates a non-uniform coating). There are also no "black spots" visible under ultraviolet light which can oftentimes be observed when a non-uniform brightener coating is present. Furthermore, it is highly unexpected that water-soluble complexes provide such improved whitening properties and accumulation effect (washfastness) since their facilitated dissolution within wash water would indicate great difficulty in exhausting such compounds from the diluent liquid to the substrate surface, particularly in a uniform coating.

B. Thermoplastic Applications

The complex formed in EXAMPLE 1, above, was then introduced into a composition for further incorporation within a polyurethane foam. The composition produced is as follows:

COMPOSITION

| Ingredient | Amount |
|------------|--------|
| Arcol ™ F3020(Aroco) | 100.00 g |
| Water | 4.52 mL |
| Dabco ™ 33 LV (Air Products) | 0.15 mL |
| L-520 silicon (OSI Industries) | 1.50 mL |
| T-10 catalyst (Air Products) | 0.32 mL |
| Toluene diisocyanate (Bayer) | 49.00 mL |
| Inventive complex from EXAMPLE 1 | 0.50 g |

This COMPOSITION was then introduced into pre-foamed polyurethane and to a control pre-foamed polyurethane control foam was added the same COMPOSITION as listed above with the omission of the inventive brightener. Each sample was then cured for 3 minutes at 160° C., allowed to cool, and then cut open. Each sample was then tested for whitening characteristics after 1 day, 10 days, and 30 days. The foam comprising the inventive complex exhibited much improved whiteness as compared to the control foam at each measuring date. Furthermore, upon washing of the polyurethane foam comprising the inventive complex, the whitening effect remained pronounced after 30 days had past. Therefore, whitening and washfastness properties within thermoplastics and thermosets are also readily available through the utilization of the inventive water-soluble substantially inorganic salt-free optical brightener complex.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications as to incorporate the features of the invention within the true meaning, spirit, and scope of such claims.

What is claimed is:

1. A water-soluble optical brightener complex comprising
   an anionic optical brightener compound; and
   a quaternary ammonium compound;
   wherein said complex has been purified to substantially remove all salts other than the anionic brightener/quatenary ammonium complex.

2. The complex of claim 1 wherein
   the quaternary ammonium compound is selected from the group consisting of dialkoxyalkyl quats, monoalkoxy quats, mono-substituted polyalkoxyalkyl quats, di-substituted polyalkoxyalkyl quats, tri-substituted polyalkoxyalkyl quats, and any mixtures thereof.

3. The complex of claim 2 wherein
   the quaternary ammonium compound is selected from the group consisting of ethyl bis(polyethoxyethanol) coco ammonium chloride, methyl bis(polyethoxyethanol) coco ammonium chloride, and mixtures thereof.

4. The complex of claim 2 wherein
   the anionic optical brightener compound is a sulfonated optical brightener compound.

5. The complex of claim 4 wherein
   the sulfonated optical brightener compound is selected from the group consisting of di-sulfonated stilbene-triazine derivatives, tri-sulfonated stilbene-triazine derivatives, hexa-sulfonated stilbene-triazine derivatives, and mixtures thereof.

6. A thermoplastic or thermoset composition comprising
   the complex of claim 1.

7. A cellulose-based substrate coated with the complex of claim 1.

8. A textile coated with the complex of claim 1.

9. A detergent composition comprising
   the complex of claim 1; and
   at least one surfactant.

10. A fabric softener composition comprising
    the complex of claim 1; and
    at least one textile softener compound.

11. A coating composition comprising
    the complex of claim 1; and
    at least one solvent.

12. The coating composition of claim 11 wherein
    said at least one solvent includes water.

13. The coating composition of claim 11 wherein
    said at least one solvent includes an organic solvent.

14. An ink formulation comprising
    the complex of claim 1; and
    at least one colorant.

* * * * *